(12) United States Patent
Lenz et al.

(10) Patent No.: US 6,904,147 B2
(45) Date of Patent: Jun. 7, 2005

(54) RELEASEABLE HARDHAT MOUNT FOR SPEAKER/MIKE

(75) Inventors: Vernon C. Lenz, Union Gap, WA (US); Chris Roose, Yakima, WA (US)

(73) Assignee: Golden West Communications, Inc., Union Gap, WA (US)

( * ) Notice: Subject to any disclaimer, the term of this patent is extended or adjusted under 35 U.S.C. 154(b) by 486 days.

(21) Appl. No.: 10/041,235

(22) Filed: Jan. 7, 2002

(65) Prior Publication Data

US 2003/0128838 A1 Jul. 10, 2003

(51) Int. Cl.[7] ............................................... H04M 1/00
(52) U.S. Cl. ...................................................... 379/430
(58) Field of Search ........................ 379/430; 381/330, 381/371, 376; 2/423

(56) References Cited

U.S. PATENT DOCUMENTS

| | | | |
|---|---|---|---|
| 3,258,534 A | 6/1966 | Goldsworthy | |
| 3,889,190 A | 6/1975 | Palmer | |
| 3,864,756 A | * 11/1975 | Desimone | ...................... 2/423 |
| RE34,525 E | 2/1994 | Lazzaroni et al. | |
| 5,590,209 A | 12/1996 | Pratt et al. | |
| 5,689,558 A | 11/1997 | Osgood et al. | |
| 5,790,681 A | 8/1998 | Leppälahti | |

FOREIGN PATENT DOCUMENTS

EP 0019838 A1 12/1980

* cited by examiner

Primary Examiner—Jack Chiang
(74) Attorney, Agent, or Firm—Leon D. Rosen

(57) ABSTRACT

A hardhat mount assembly (12) is provided for mounting a speaker device (14) on a hardhat (10), that allows adjustment of the speaker device position to allow the worker to choose a comfortable position. The mount assembly includes an inner mount part (50) for mounting on the hardhat, a linkage (100) having an upper end pivotally connected to the inner mount part and a lower end pivotally connected to the speaker device, both pivot connections having pivot axes extending in forward and rearward directions. One inner mount device includes a pair of wings (52, 54) with Velcro (74) on their inner surfaces that attach to Velcro pads (80, 82) that have been mounted with contact adhesive on a side of the hardhat. Another inner mount device includes a pair of plates (210, 212) with adjacent edges (214, 216) hinged together and distant ends (220, 222) that can be latched together to clamp a sweatband (202) of the hardhat lining between them. Another inner mount device (130) has a U-shaped part that straddles a thickened lip (132) at the side of a hardhat, and has at least one screw (150) that screws against the hardhat at a location adjacent to the stepped thickness of the hardhat lip.

12 Claims, 4 Drawing Sheets

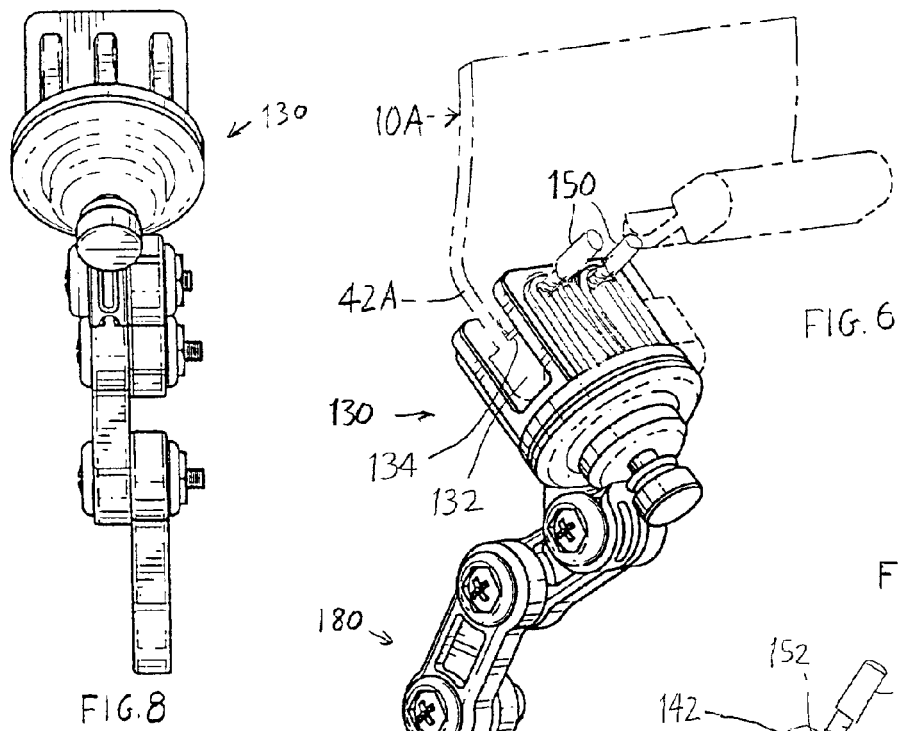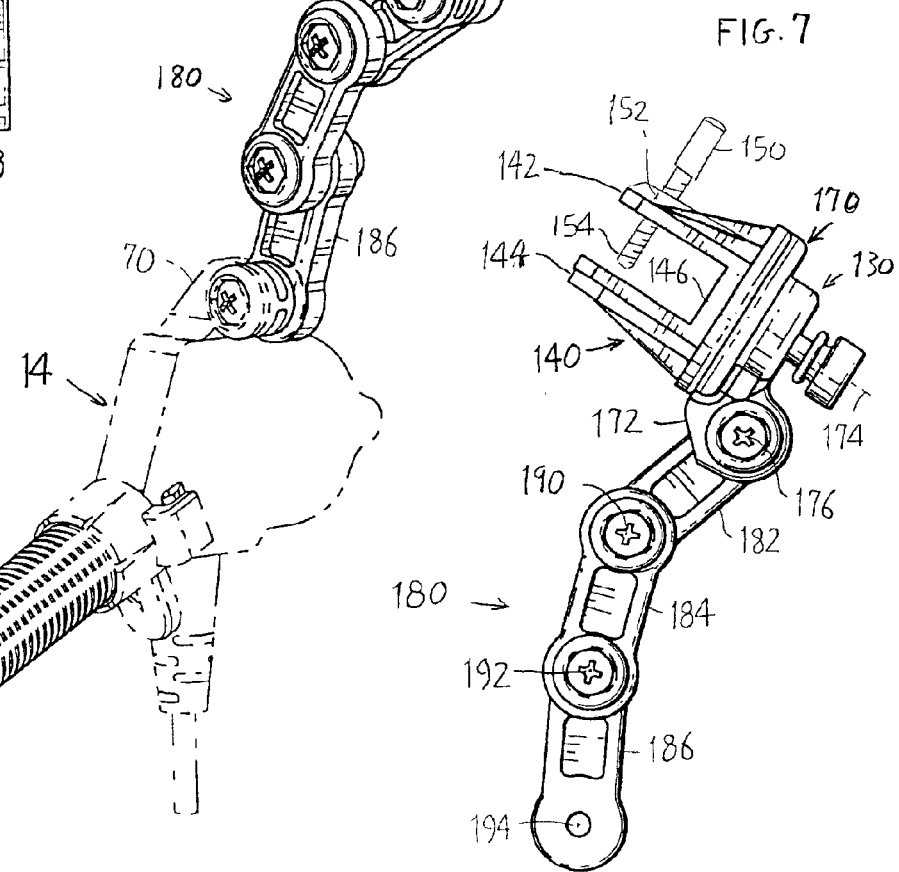

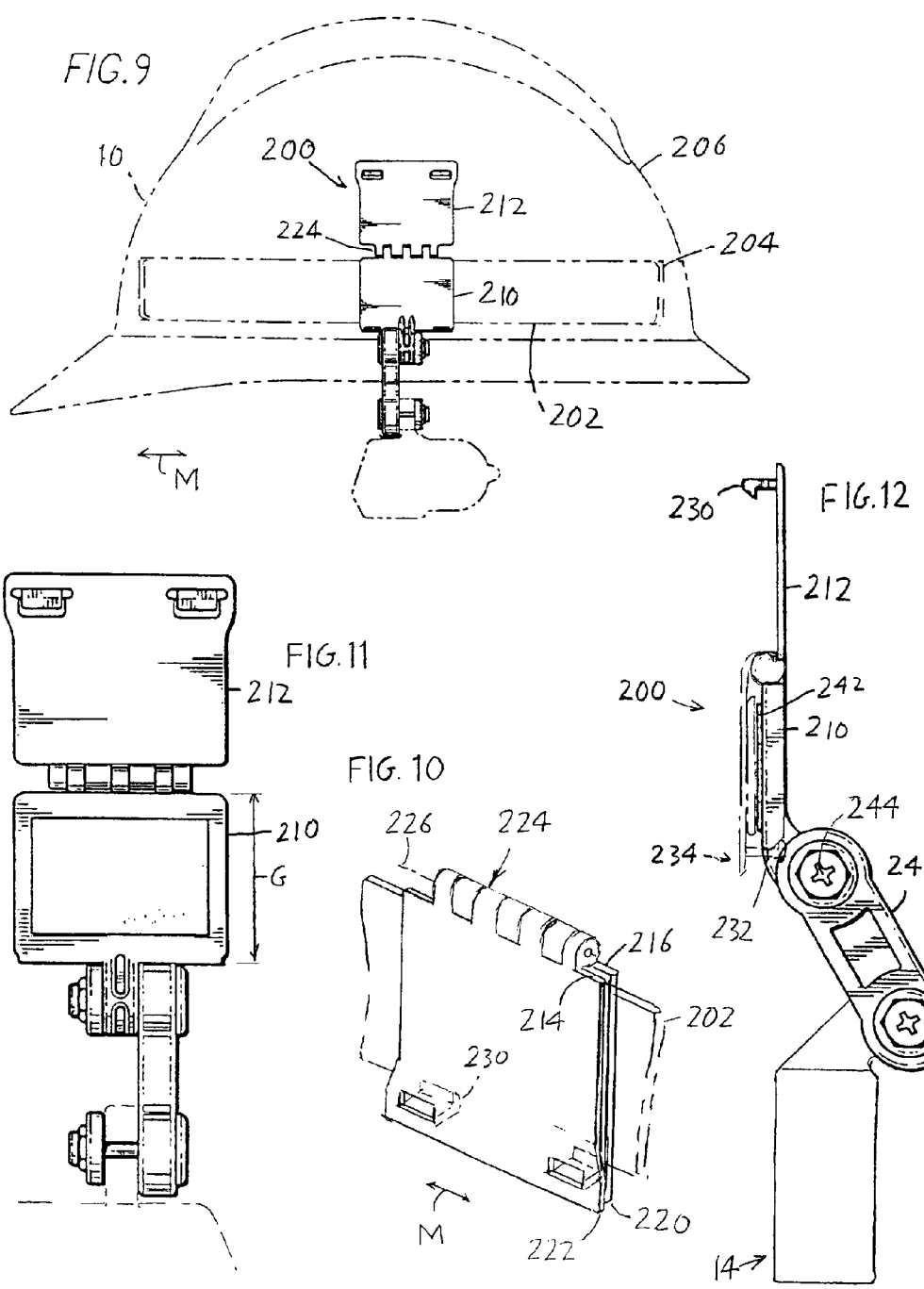

RELEASEABLE HARDHAT MOUNT FOR SPEAKER/MIKE

BACKGROUND OF THE INVENTION

Workers who wear hardhats often need radio communications with other workers or a supervisor. This can be accomplished by mounting a speaker device, which includes a speaker and which also may include a microphone at the end of a boom, on the worker's hardhat, and usually with a cord extending from the speaker device to a radio on the worker's belt. Workers generally prefer that a speaker device be positioned with a speaker close to and aligned with the worker's ear, but spaced far enough to avoid direct contact during everyday movement of the worker. Since different workers have different physical dimensions and may position the liners of their hardhats differently, it is desirable that the apparatus for mounting a speaker device on the hardhat be adjustable.

SUMMARY OF THE INVENTION

In accordance with one embodiment of the present invention, a speaker hardhat mount assembly is provided that mounts a speaker device on a side of a hardhat, in a manner that permits versatile adjustment of the speaker position. The mount assembly includes a mount device with an inner mount part for mounting on a side of the hardhat, and a pivot connection part such as a lug. The speaker device also has a pivot connection part such as a lug. A linkage, which includes at least one link, has opposite ends that are each pivotally connected about a pivot axis, to the pivot connection of the inner mount part and to the pivot connection of the speaker device. The pivot connections permit pivoting about axes that are parallel to one another and that extend in forward and rearward directions. The linkage can be extended by connecting identical links in tandem, each link being connectable to an adjacent one by a screw that passes through holes at adjacent ends of the links and a nut that clamps the links together at a predetermined pivot angle. The same screw and nut mounting enables a hole at an end of a link to pass through a hole in a lug of the inner mount or of the speaker device.

One inner mount device includes a pair of elongated wings with inner ends that merge and outer ends that extend away from each other but at upward inclines to lie at higher levels than the merged ends. The wings can be mounted on a side of hardhat by a Velcro covering at the inner surfaces of the wings and by Velcro pads mounted by adhesive to the outside of the helmet.

Another inner mount part is U-shaped, with a pair of plates that can clamp a band of the hardhat liner between them, the plates having adjacent ends that are hinged together and far ends that can be latched together. Another inner mount device is designed for a hardhat with a lip of enlarged thickness, and includes a U-shaped part with legs that straddle the lip and a screw that clamps to a portion of the hardhat just beyond the thickened lip.

The novel features of the invention are set forth with particularity in the appended claims. The invention will be best understood from the following description when read in conjunction with the accompanying drawings.

BRIEF DESCRIPTION OF THE DRAWINGS

FIG. 6 is a front isometric view of a speaker hardhat mount assembly of another embodiment of the invention, and showing it mounted on a side a hardhat that has a lip of enlarged thickness, the drawing showing, in phantom lines, a portion of a hardhat with an enlarge lip that extends downward incline, and also showing a lip that extends at an upward incline.

FIG. 7 is a front elevation view of the mount assembly of FIG. 7.

FIG. 8 is a side elevation view of the mount assembly of FIG. 7.

FIG. 9 is a side elevation view of a mount assembly, shown mounted on a band of a hardhat liner, with the band, hardhat, and speaker device all shown in phantom lines, and with the inner mount device shown not yet clamped onto the liner band.

FIG. 10 is an inner isometric view of the inner mount device of FIG. 9, with the inner mount device fully clamped to a liner band of the hardhat liner.

FIG. 11 is an inner side elevation view of the mount assembly of FIG. 9.

FIG. 12 is a front elevation view of the mount assembly of FIG. 9, including the speaker device.

DESCRIPTION OF THE PREFERRED EMBODIMENTS

Figures 1, 2:
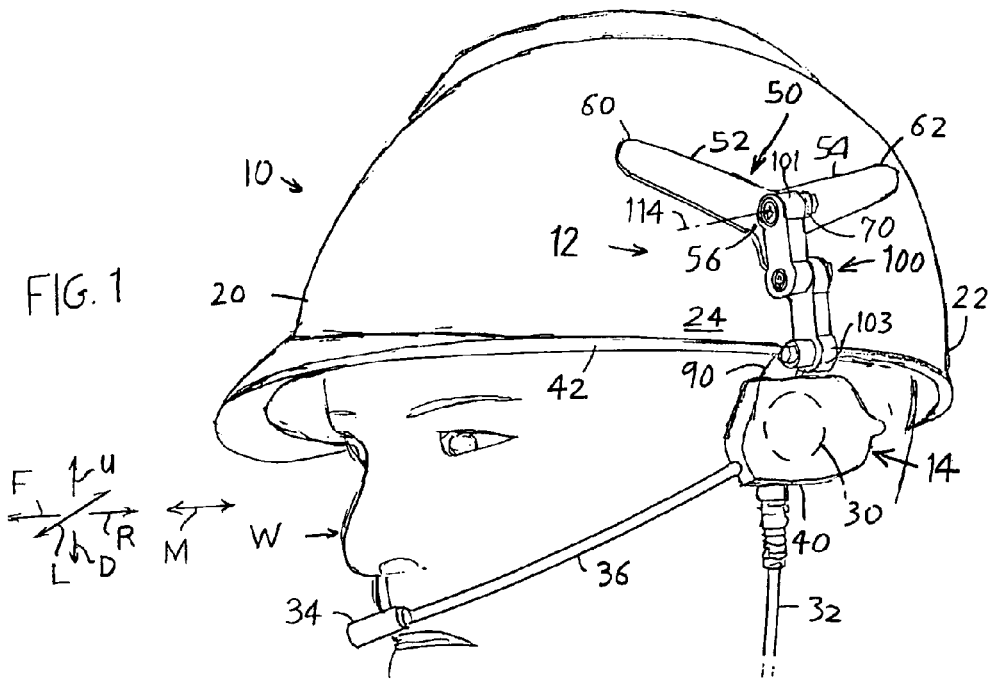
FIG. 1 is an isometric view of a speaker hardhat mount assembly of the present invention shown mounted on a hardhat worn by a worker.
FIG. 2 is a side elevation view of the mount assembly of FIG. 1, with the hardhat shown in phantom lines.

FIG. 1 illustrates a hardhat 10 mounted on the head of a worker W, and a speaker hardhat mount assembly 12 for mounting a speaker device 14 on a side of the hardhat to lie beside the worker. The hardhat has front and rear ends 20, 22 which are spaced apart in front F and rear R directions, which are longitudinal M directions. The hardhat also has opposite sides 24 spaced apart in lateral directions L. The speaker device 14 has a speaker 30 that generates sound representing sound from a supervisor or another worker, which is transmitted from a two-way radio (not shown) that is connected to the speaker device through a cable 32. In many cases, the speaker device also has a microphone 34 lying at the end a boom 36 that extends from a frame 40 of the speaker device 14.

Two factors are involved in designing a mount assembly 12, one of these being the design of an assembly that holds securely to the hardhat, preferably in a detachable joint that allows removal, as when the assembly is to be transferred to another hardhat, removed for repair, etc. Another factor is that the assembly should allow the frame 40 of the speaker device to be placed in an optimal position for a particular worker. The speaker 30 is large enough that its longitudinal M position is easily chosen by selecting the position that the assembly is mounted on the hardhat, but the height of the speaker and its closeness to the ear of the person should be finely adjustable. It is noted that hardhats generally have rims 42, and the adjustment of the speaker position must take into account the fact that many connection must extend around the rim.

FIG. 1 shows a mount part 50 that mounts on a side 24 of the hardhat. The mount part includes a pair of wings 52, 54 with proximal ends 56 that merge and with distal ends 60, 62 that are distant from the proximal ends. The front wing 52 extends primarily forwardly F and at an upward U incline, while the rearward wing 54 extends primarily rearwardly R and at an upward incline. As shown in FIG. 2, applicant also provides a tab 64 that extends downwardly D from the merged proximal ends 56. A lug 70 (FIG. 3) extends away from the thin mounting part formed by the wings and tab.

Figure 5:
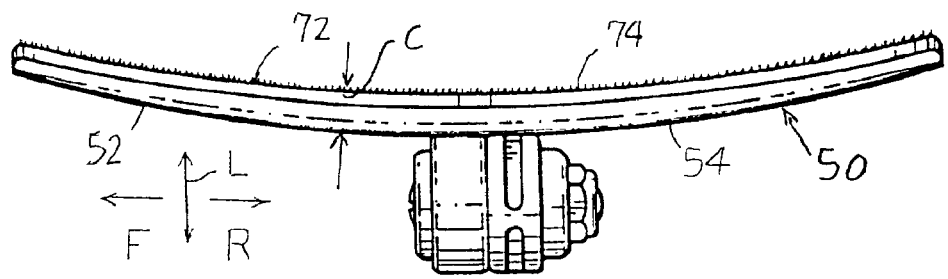
FIG. 5 is a top view of the mount assembly of FIG. 2.

As shown in FIG. 5, an inner surface 72 of the mount part 50 that forms the wings 52,54 is concavely curved, to enable it to lie everywhere close to the convexly curved helmet side. Velcro 74 covers the inner surface 72. As indicated in FIG. 2, applicant mounts the mount part 50 by first attaching three pads 80, 82, 84 to the helmet side 24 with contact adhesive. The pads are provided with contact adhesive on their inner side (covered by a peelable film) and have Velcro on their outer sides. After the pads, 80–84 have been attached to the helmet side, the mount part 50 is attached, with its Velcro 74 being complimentary to the Velcro on the pads, for a mounting connection that is detachable.

Figure 3:
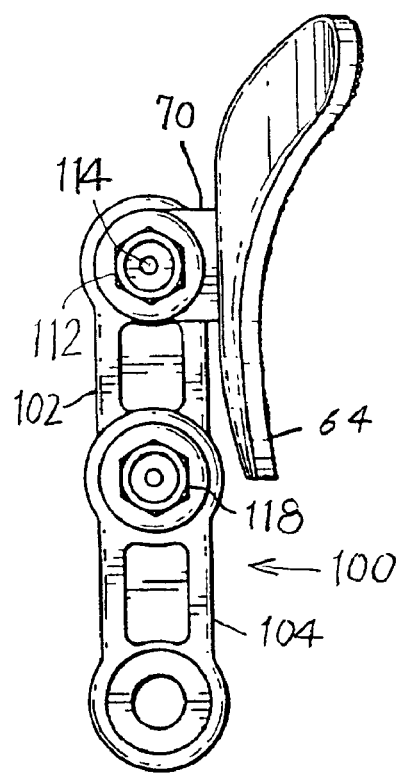
FIG. 3 is a rear elevation view of the mount assembly of FIG. 2.
Figure 4:
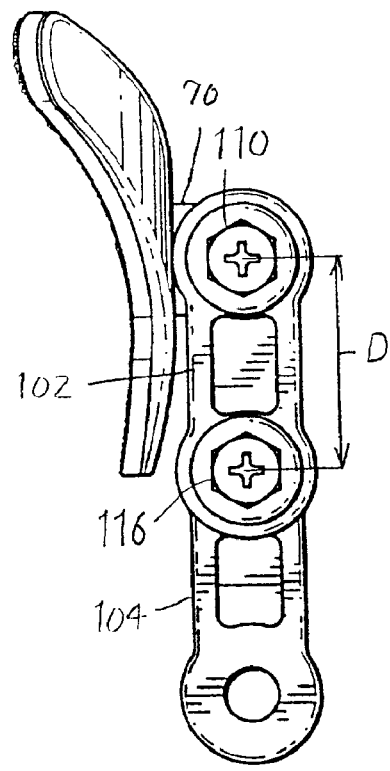
FIG. 4 is a front elevation view of the mount assembly of FIG. 2.

As shown in FIG. 1, the frame 40 of the speaker device 14 has a pivot connection part 90 in the form of a speaker device lug. The mount device lug or pivot connection part 70 is connected to the lug 90 by a linkage 100 with opposite ends 101, 103. As shown in FIGS. 3 and 4, the linkage 100 includes two links 102, 104. A first or uppermost link 102 is connected to the pivot connection part 70 by a bolt 110 and nut 112 that permit pivoting about an axis 114 until the nut 112 is tightened. Similarly, the two links 102, 104 are connected by another bolt 116 and nut 118 that allows pivotal adjustment about an axis 117 extending in front-rear directions F, R. As indicated in FIG. 2, the bottom of the second link 104 is connected to the pivot connection part 90 of the device frame about axis 119 by another screw 120 and nut 122.

In FIG. 1, the connection part or lug 70 of the mount part 50 lies perhaps 1.5 inches above the hardhat rim 42. Accordingly, applicant finds that he requires two links to hold the speaker device 14 closely adjacent to the worker's ear. If two links are not enough, applicant adds a third link in tandem with the other two links 102, 104. All links are identical, so a small supply of such links, screws and nuts is sufficient to allow all workers to adjust their speaker devices as they require. The uppermost pivot connection at axis 114 can be left only partially tightened, to allow the linkage 100 to swing out before the hardhat is placed on the head, and to then swing in.

FIGS. 6–8 illustrate another mount with an inner mount part 130 that is constructed specifically for mounting on the rim 42A of a hardhat 10A that has a lip 132 of increased thickness with a step at 134 where the thickness suddenly increases. The mount part 130 shown in FIG. 7 includes a U-shaped part 140 formed by a pair of plates 142, 144 and a base 146 that joins adjacent edges of the two plates. A pair of screws 150 are threadably engaged with holes 152 in one of the plates 142. The screws can be tightened so their lower ends 154 press against the rim at the step 134, to tightly clamp the rim between the plates. Applicant prefers to provide another pivot joint 170 that permits a lug 172 on the mount part 130 to pivot about an axis 174 that is perpendicular to an axis 176 that extends in forward and rearward directions. In FIGS. 6–8, a linkage 180 is shown as comprising three links 182, 184, 186 that are identical and that provide pivotable connections at axes 190, 192, 194 that are parallel to the axis 176. FIG. 6 shows that the lug 70 on the speaker device 14 is pivotally connected to the lower end of the lowermost link 186. Of course, all pivotable connections can be fixed in position by tightening the screw on a corresponding nut. The pivot connection about axis 176 can be only partially tightened.

FIGS. 9–12 illustrate a mount part 200 that is designed to be mounted on a hardhat 10 by attaching to a band 202 of the hardhat liner 204. Such liners 204 are usually mounted in hardhat shells 206 to enable a worker to comfortably wear the shell. The mount part 200 includes a pair of rigid plates 210, 212 which can pivot between the open position of FIG. 9 and the closed position of FIG. 10. In the closed position of FIG. 10, edges 214, 216 are uppermost and edges 220, 222 are lowermost. The adjacent upper edges 214, 216 are pivotally connected by a hinge 224 that connects the edges about an axis 226 that extends in front and rear longitudinal directions M. The nonadjacent, or far edges 220, 220 are close only in the closed position. As shown in FIG. 12, the second plate 212 has a pair of latch parts 230 in the form of a pair of hooks, that engage other latch parts 232 in the form of edges at the bottom of the first plate 210, when the second plate 212 is pivoted down to the position of FIG. 10. The latches 234 formed by the parts 230, 232 at edges of the plates, enables removal of the mount part 200 that securely holds to the band until such removal. The particular mount part 200 shown in FIGS. 9–12 are shown with a single link 240, which may be sufficient due to the position of the band 202. However, two or more links can be readily attached in tandem, where the worker finds this is necessary. The pivot connection at axis 244 can be only partially tightened.

Applicant has designed and constructed speaker hardhat mount assemblies of the construction illustrated. Each link had a distance D (FIG. 4) of one inch between the pivot axes at its opposite ends. A length of about one inch (0.5 inch to 2 inches) enables choice of approximate length, with fine adjustments accomplished by pivoting of the links to slightly change the distance between the inner mount device and the speaker device lug, to move the speaker device closer or further from the worker's ear. The winged inner mount part 50 of FIG. 2 has wings each of a length A of 5.5 cm, an average width B of 1.5 cm, and a thickness C (FIG. 5) OF 3 mm (including the Velcro). The pivoting plates inner mount part 200 of FIGS. 9–12 has plate height G (FIG. 11) of 3 cm and an upper plate 212 of a thickness of 1.3 mm, with a rubber pad 242 of about 1 mm thickness on plate 210.

Thus, the invention provides a mount assembly for mounting a speaker device on a hardhat. The assembly includes an inner mount part or device that can be fixed to the hardhat and a linkage having at least a first link with opposite ends that are each formed for pivotal mounting, with one end of the linkage pivotally connected to the inner mount part and the opposite end pivotally connected to a speaker device. Identical links, each of about the same length (within 25% of one another) and each of about one inch length can be coupled together in tandem by screw and nut fasteners, to allow each end of each link to be pivotally coupled to a desired orientation and then locked at that orientation. One inner mount device includes a pair of wings. Another inner mount device includes a U-shaped bracket that mounts on the rim of a hardhat that has a lip of increased thickness. Another inner mount device includes a pair of plates that are joined by a hinge and that can be locked together by a latch, to clamp a band of a hardhat liner between them.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A speaker hardhat mount assembly for mounting a speaker device on a hardhat that has front and rear hardhat ends and opposite hardhat sides, comprising:

an inner mount part for mounting on one of said sides of the hardhat, said inner mount part having a mount pivot connection part;

said speaker device having a frame with a frame pivot connection part;

a linkage that connects said pivot connection parts;

said linkage having at least a first rigid link and having opposite linkage ends each pivotally connected for pivoting about pivot axes to the mount pivot connection part and to the frame pivot connection part;

said pivot axes each extends primarily in forward and rearward directions, whereby to enable fine adjustment of the height, angle and orientation of the speaker device with respect to the ear of a wearer of said hardhat.

2. The assembly described in claim 1 wherein:

said linkage includes a plurality of links that are all of about the same length, said links being connected end-to-end for pivotal adjustment thereat about an axis that extends in forward and rearward directions.

3. The assembly described in claim 2 wherein:

said links each includes a screw at each end of the link and lying on the corresponding axis thereat, each screw being loosenable for link pivoting and tightenable to fix the relative pivotal orientation of a corresponding pair of links.

4. The assembly described in claim 1 wherein:

said linkage includes a single rigid link forming said opposite linkage ends, said single link having pivot axes at said opposite ends, said pivot axes being spaced by between 0.5 inch and 2 inches.

5. The assembly described in claim 1 wherein:

said inner mount part includes a pair of rigid plates with upper and lower horizontally-extending edges, a hinge that pivotally connects a first of said pairs of horizontal edges and a latch that locks a second of said pairs of horizontal edge together when they are pivoted together, whereby to enable rapid mounting about a liner band of the hardhat.

6. The assembly described in claim 1 wherein:

said inner mount device includes a rotation joint that connects said mount part to said pivot connection part thereof, said rotation joint allowing pivoting of said pivot connection part about a rotation axis that is perpendicular to said pivot axes.

7. A speaker hardhat mount assembly for mounting a speaker device on a hardhat that has a hard shell with an outside surface and with front and rear shell ends and opposite shell sides, including:

an inner mount part having a pair of elongated wings for lying against a side of the outside surface of the shell, said wings having proximal ends that merge and distal ends that are spaced apart, said distal ends lying above said merged proximal ends, and said inner mount device having a lug extending from substantially said merged proximal ends;

said speaker device being held on an end of a linkage that is pivotally coupled to said lug.

8. The assembly described in claim 7 wherein:

said inner mount part includes a downward tab part that extends downward from said merged proximal ends.

9. The assembly described in claim 7 wherein:

said wings have inner surfaces that are concavely curved, whereby to conform to the hardhat.

10. The assembly described in claim 7 including said hardhat, and wherein:

said wings have inner surface for facing the hardhat and have Velcro on the inner surfaces; and including a pair of Velcro pads adhesively attached to one of said hardhat sides at locations to attach to said Velcro on said wings.

11. A speaker hardhat mount assembly for mounting a speaker device on a hardhat that has front and rear hardhat ends and opposite hardhat sides, comprising:

an inner mount part for mounting on one of said sides of the hardhat, said inner mount part having a pivot connection part;

said speaker device having a frame with a pivot connection part;

a linkage that connects said pivot connection parts;

said linkage having at least a first link and having opposite linkage ends each pivotally connected about a pivot axes to the pivot connection part of said inner mount part and to the pivot connection part of said frame;

said pivot axes each extends primarily in forward and rearward directions, whereby to enable fine adjustment of the height, angle and orientation of the speaker device with respect to the ear of a wearer of said hardhat;

said inner mount part includes a pair of wings for lying against a side of the outside of the hardhat, said wings having proximal ends that merge and distal ends that are spaced apart, with one distal end lying forward and above said merged proximal ends and the other distal end lying rearward and above said merged proximal ends.

12. The assembly described in claim 11 wherein:

said inner mount part includes a tab that extends downwardly from the merged proximal ends of said wings.

* * * * *